United States Patent [19]
Iwahashi

[11] Patent Number: 5,953,454
[45] Date of Patent: Sep. 14, 1999

[54] MINIMUM DISTANCE STORAGE DEVICE

[75] Inventor: Hiroyuki Iwahashi, Soraku-gun, Japan

[73] Assignee: Sharp Kabushiki Kaisha, Osaka, Japan

[21] Appl. No.: 08/657,671

[22] Filed: May 31, 1996

[30] Foreign Application Priority Data

Jun. 2, 1995 [JP] Japan .................................. 7-136406

[51] Int. Cl.$^6$ .................................................. G06K 9/68
[52] U.S. Cl. ............................................................ 382/218
[58] Field of Search .................................. 382/218, 220, 382/219, 224

[56] References Cited

U.S. PATENT DOCUMENTS 4,718,102 1/1988 Crane et al. ................................. 382/3
5,303,381 4/1994 Yagasaki ................................... 395/800

FOREIGN PATENT DOCUMENTS 63231525 9/1996 Japan .

*Primary Examiner*—Phuoc Tran

[57] ABSTRACT

A minimum distance storage device for storing distances obtained in pattern recognition as arranged in the ascending order easily generates addresses with no need for multiloop control and at the same time of detects a minimal distance of the same category. A read-out distance read from a result memory and temporarily held in a first register, and an input distance input from a distance calculating portion and temporarily held in a second register, are compared with each other by a second selector. The read-out distance, if smaller than the input distance, is written in the same place where it was stored in the result memory. If the read-out distance is larger than the input distance, the latter is written in the place where the read-out distance was stored and, then, the larger read-out distance and other read-out distances are written in places moved to the right each by one in sequence in the result memory.

4 Claims, 10 Drawing Sheets

THE INPUT IS INTERPOSED IN THE SHOWN PLACE.
ALL HATCHED DATA ARE SHIFTED TO THE RIGHT.
THE MAXIMAL VALUE IS DELETED FROM THE MEMORY.

FIG.6

| ADDRESS | READ OPERATION | | BRANCHING CONDITION | WRITE OPERATION | |
|---|---|---|---|---|---|
| i | B | A | | MEMORY(i) | A |
| 0 | 5 | 17 | A≧B | 5 | 17 |
| 1 | 8 | 17 | A≧B | 8 | 17 |
| 2 | 16 | 17 | A≧B | 16 | 17 |
| 3 | 20 | 17 | A<B | 17 | 20 |
| 4 | 30 | 20 | A<B | 20 | 30 |
| 5 | 50 | 30 | A<B | 30 | 50 |
| 6 | 60 | 50 | A<B | 50 | 60 |
| 7 | 70 | 60 | A<B | 60 | 70 |
| 8 | 80 | 70 | A<B | 70 | 80 |
| 9 | 90 | 80 | A<B | 80 | 90 |

(21 points to the MEMORY(i)=17 at address 3)

FIG.9

BEFORE SORTING (a)

| MG | ∞ | ∞ | ∞ | ∞ | ∞ | ∞ | ∞ | ∞ | ∞ | ∞ |
|----|---|---|---|---|---|---|---|---|---|---|
| MC | ∞ | ∞ | ∞ | ∞ | ∞ | ∞ | ∞ | ∞ | ∞ | ∞ |
|    | 0 | 1 | 2 | 3 | 4 | 5 | 6 | 7 | 8 | 9 |

↑

INPUT | DISTANCE:00 | CATEGORY:00

(c)

| MG | 00 | 10 | 20 | 30 | 40 | 50 | 60 | 70 | 80 | 90 |
|----|----|----|----|----|----|----|----|----|----|----|
| MC | 00 | 10 | 30 | 40 | 50 | 60 | 70 | 80 | 90 | 20 |
|    | 0  | 1  | 2  | 3  | 4  | 5  | 6  | 7  | 8  | 9  |

↑

INPUT | DISTANCE:26 | CATEGORY:90

(e)

| MG | 00 | 10 | 20 | 26 | 30 | 40 | 50 | 60 | 70 | 90 |
|----|----|----|----|----|----|----|----|----|----|----|
| MC | 00 | 90 | 10 | 20 | 40 | 50 | 60 | 70 | 80 | 30 |
|    | 0  | 1  | 2  | 3  | 4  | 5  | 6  | 7  | 8  | 9  |

INPUT | DISTANCE:18 | CATEGORY:90

AFTER SORTING (b)

| 00 | ∞ | ∞ | ∞ | ∞ | ∞ | ∞ | ∞ | ∞ | ∞ |
|----|---|---|---|---|---|---|---|---|---|
| 00 | ∞ | ∞ | ∞ | ∞ | ∞ | ∞ | ∞ | ∞ | ∞ |
| 0  | 1 | 2 | 3 | 4 | 5 | 6 | 7 | 8 | 9 |

(d)

| 00 | 10 | 20 | 26 | 30 | 40 | 50 | 60 | 80 | 90 |
|----|----|----|----|----|----|----|----|----|----|----|
| 00 | 10 | 30 | 90 | 40 | 50 | 60 | 70 | 80 | 20 |
| 0  | 1  | 2  | 3  | 4  | 5  | 6  | 7  | 8  | 9  |

↳ TO BE DELETED (f)

| 00 | 10 | 20 | 26 | 30 | 40 | 50 | 60 | 70 | 90 |
|----|----|----|----|----|----|----|----|----|----|----|
| 00 | 90 | 10 | 20 | 40 | 50 | 60 | 70 | 80 | 30 |
| 0  | 1  | 2  | 3  | 4  | 5  | 6  | 7  | 8  | 9  |

FIG.10

| ADDRESS NUMBER | READ OPERATION ||||| BRANCHING CONDITION |||| WRITE OPERATION |||||
|---|---|---|---|---|---|---|---|---|---|---|---|---|---|
| | CATEGORY | DISTANCE | CATEGORY | DISTANCE | | FLAG || CRITERION | MEMORY(I) || CATEGORY | DISTANCE ||
| (I) | D | B | C | A | | RF | WF | | MC | MG | C | A |
| 0 | 00 | 00 | 90 | 26 | | 0 | 0 | A<B | 00 | 00 | 90 | 26 |
| 1 | 10 | 10 | 90 | 26 | | 0 | 0 | A≧B | 10 | 10 | 90 | 26 |
| 2 | 30 | 20 | 90 | 26 | | 0 | 0 | A≧B | 30 | 20 | 90 | 26 |
| 3 | 40 | 30 | 40 | 26 | | 0 | 0 | A≧B | 90 | 26 | 40 | 30 |
| 4 | 50 | 40 | 50 | 30 | | 0 | 1 | A<B | 40 | 30 | 50 | 40 |
| 5 | 60 | 50 | 60 | 40 | | 0 | 1 | A<B | 50 | 40 | 60 | 50 |
| 6 | 70 | 60 | 70 | 50 | | 0 | 1 | A<B | 60 | 50 | 70 | 60 |
| 7 | 80 | 80 | 80 | 60 | | 0 | 1 | A<B | 70 | 60 | 80 | 80 |
| 8 | 90 | 80 | 80 | 80 | | 1 | 1 | A≧B | 80 | 80 | 90 | ∞ |
| 9 | 20 | 90 | 90 | ∞ | | 0 | 1 | A≧B | 20 | 90 | 90 | ∞ |

FIG.11

| ADDRESS NUMBER (I) | READ OPERATION ||||| BRANCHING CONDITION |||| WRITE OPERATION |||||
|---|---|---|---|---|---|---|---|---|---|---|---|---|---|
| | CATEGORY | DISTANCE | CATEGORY | DISTANCE | | FLAG | CRITERION | MEMORY(I) | | CATEGORY | DISTANCE |
| | D | B | C | A | RF | WF | A<B | MC | MG | C | A |
| 0 | 00 | 00 | 90 | 18 | 0 | 0 | A<B | 00 | 00 | 90 | 18 |
| 1 | 90 | 10 | 90 | 18 | 1 | 0 | A≧B | 90 | 10 | 90 | ∞ |
| 2 | 10 | 20 | 90 | ∞ | 0 | 1 | A≧B | 10 | 20 | 90 | ∞ |
| 3 | 20 | 26 | 90 | ∞ | 0 | 1 | A≧B | 20 | 26 | 90 | ∞ |
| 4 | 40 | 30 | 90 | ∞ | 0 | 1 | A≧B | 40 | 30 | 90 | ∞ |
| 5 | 50 | 40 | 90 | ∞ | 0 | 1 | A≧B | 50 | 40 | 90 | ∞ |
| 6 | 60 | 50 | 90 | ∞ | 0 | 1 | A≧B | 60 | 50 | 90 | ∞ |
| 7 | 70 | 60 | 90 | ∞ | 0 | 1 | A≧B | 70 | 60 | 90 | ∞ |
| 8 | 80 | 70 | 90 | ∞ | 0 | 1 | A≧B | 80 | 70 | 90 | ∞ |
| 9 | 30 | 90 | 90 | ∞ | 0 | 1 | A≧B | 30 | 90 | 90 | ∞ |

MINIMUM DISTANCE STORAGE DEVICE

BACKGROUND OF THE INVENTION

1. Field of the Invention

The present invention relates to a minimum distance storing device for storing obtained minimum distances by arranging them in ascending order (or in descending order of similarity).

2. Description of the Background Art

A conventional pattern recognition method used for recognition of patterns in speech data and character data is such as to store an unknown input pattern and a plurality of known standard patterns obtained by the same manner that the unknown pattern is obtained, determine distance values (or similarity values) between the unknown pattern and every known pattern, select a plurality of standard patterns that have smaller distance values (or higher similarity values), store the patterns in a result memory after arranging them in the ascending order (or in the descending order of similarity) and then specify the unknown input pattern according to the plurality of the stored distance values (or similarity values) in the result memory.

As described above, the conventional pattern recognition stores the data in the result memory in the ascending distance-value order or in the descending similarity order, but both orders are generally the same relationship in tens of being sequential. Accordingly, a case when N pieces of resultant data are stored in the ascending order will be, by way of example, described as follows:

A sort algorithm is a known method for arranging N pieces of distances in the ascending order. The representative process for arranging distances is performed in the ascending order.

To store N pieces of distance values in ascending order, a result memory must have N pieces of memory areas [from address (0) to address (N–1)]. The results of performed algorithm are recorded in the addresses 0 to (N–1) of the result memory.

Namely, a content A of the leading address (I=0) of the result memory is first read, an address (J=I+1) adjoining to the leading address is determined and then a content B of the result memory, which is designated by address J, is read out.

Both the contents A and B are compared with each other. If A is smaller than B (i.e., A<B), no operation is performed other than a jump to the next step. If A≧B, this step replaces A and B with each other and proceeds to the next step. In other words, this step causes A to be a content of the memory area addressed by (J) and B to be a content of the memory area addressed by (I).

The next step updates the address (I) and repeats the similar processing operation. This cycle is repeated by (N–1) times to move a maximal value stored in one of the addresses (0) to (N–1) into the memory area specified by the address (N–1).

Processing addresses of the result memory are then changed to the addresses (0) to (N–2) and a processing cycle similar to the above-mentioned cycle is repeated by (N–2) times to store the maximal value among the addresses (0) to (N–2) in the memory address (N–2).

The processing steps are repeatedly performed until the result memory address reaches the address (0), i.e., by further performing steps (n–3), (n–4) . . . (0). The distance values are stored in the ascending order in the result memory.

In regard to the number of memory accesses which may vary depending on the branch conditions, the above-mentioned processing may access the memory in a shortest path:

$$TI_{\min} = 2 \times \sum_{k=1}^{n-1} K = N \times (N-1)$$

and in a longest path:

$$TI_{\max} = 4 \times \sum_{k=1}^{n-1} K = 2 \times N \times (N-1).$$

In the above-mentioned conventional example, the number of memory accesses is an important factor that may have a great influence on a processing time. The less the number of accesses is, the shorter the processing time is. The above-mentioned conventional process, however, must access the same addresses each several times (e.g., address (0) by (N–1) times, address (1) by (N–2) . . . ), that may prolong the processing time.

Hardware necessary for realizing the above-mentioned processing must include a system for generating adjoining addresses and a multiloop control system and, therefore, may be large and complicated.

The application of the above-described algorithm without modification is not practical because the pattern recognition requires a large number of reference patterns. The number of reference patterns, therefore, must be reduced to the minimum required.

In other words, in every calculation of a distance between an input pattern and a reference pattern, a maximum value is determined among N pieces of stored values and is replaced with the calculation result if it is larger than the calculation result. As a result of this, N pieces of minimum distance values are randomly stored.

The minimum-distance memory (for storing distance values in the ascending order) in the pattern recognition involves another problem to be considered. This relates to how to process the same category data.

Usually, a plurality of standard patterns for the same category may be prepared for pattern recognition. Accordingly, the minimum-distance memory adopts the minimal distance-value in the same category as a representative of the category.

Namely, besides the above-mentioned distance-value relation, the distance-value relation in the same category must be also regarded. For the category processing, the conventional processing method requires more processing time and its hardware may be more increased in size and more complicated in structure.

SUMMARY OF THE INVENTION

The present invention was made to solve the above-mentioned problems and has as its object the provision of a minimum-distance storage device which is capable of easily generating addresses with no need for multiloop control and of simultaneously detecting a minimum distance value of the same category.

An embodiment of the present invention may be summarized as follows:

A distance value read by a first reading portion from a first storage portion is temporarily stored in a first temporary memory and an input distance value input by a distance calculating portion is temporarily stored in a second temporary memory. Both distance values are compared with each other by a first writing portion.

When the read distance value is smaller than the input distance value, the first writing portion writes the read value in the same place where it was stored in the first storage portion. When the comparison result indicates the read distance value is larger than the input distance value, the first writing portion writes the input distance value into the place where the read distance value was stored and at the same time rewrites the existing thereafter distance-values including the compared one into positions moved to the right in sequence in the first storage portion.

Namely, the input distance-value is written in an address in the first storage portion, a distance value stored in this address is re-written in a proceeding address (moved to the right by one therefrom), a distance value stored in that address is re-written in the next address and proceeding distance values shall be written in proceeding addresses in sequence.

This method offers such an advantage that interposing calculation result makes it possible to utilize resultant data that have been processed and stored in the storage.

Another embodiment of the invention is summarized as follows:

A distance value and category data read by a second reading portion from a second storage portion are temporarily stored in a third temporary memory and an input distance-value and category code input by a distance calculating portion are temporarily stored in a fourth temporary memory. The second writing portion compares the input distance-value with the read-out distance-value and the same processing operations as the first writing portion are performed in the above-described first embodiment.

On the other hand, a third writing portion performs the following processing operations in parallel with and having priority to the processing by the second writing portion.

The third writing portion compares the category code held in the third temporary memory with the category code held in the fourth temporary memory. When both the category codes coincide with each other and the read-out distance-value is smaller than the input distance-value, the third writing portion writes the coincident category and the read-out distance-value in the same place where they were stored in the second storage portion. In case when both the category codes coincide with each other and the read-out value is larger than the input value, the third writing portion deletes the coincident category and input distance value from the second storage portion.

Namely, the comparison of the read-out distance value and its category code, which were read-out from a specified address of the second storage portion and are held in the third temporary memory, with the input distance-value and its category code, which are held in the fourth temporary memory, causes the content of the address of the input distance-value and the coincident category code to be deleted if the read-out distance-value is larger than the input distance-value and both the category codes coincide with each other, or causes the read-out value and the coincident category code to be written in the address where said value and category code were stored without sorting if the read-out distance-value is smaller than the input distance-value and both the category codes coincide with each other.

The interposition of the calculation result makes it possible to simultaneously perform processing of the same category codes utilizing resultant data that have been processed and stored in the storage.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. dr

BRIEF DESCRIPTION OF THE DRAWINGS

The present invention will become more fully understood from the detailed description given hereinbelow and the accompanying drawings which are given by way of illustration only, and thus, are not limitative of the present invention and wherein:

FIG. 6 is a list of operations corresponding to the concept illustration of FIG. 5.

FIG. 9($a$)–($f$) are views showing the another embodiment of a minimum-distance storage device of the present invention.

FIG. 10 is a list of operations corresponding to the concept illustrations of (c) and (d) in FIG. 9.

FIG. 11 is a list of operations corresponding to the concept illustrations of (f) and (e) in FIG. 9.

PREFERRED EMBODIMENTS OF THE INVENTION

Figure 1:
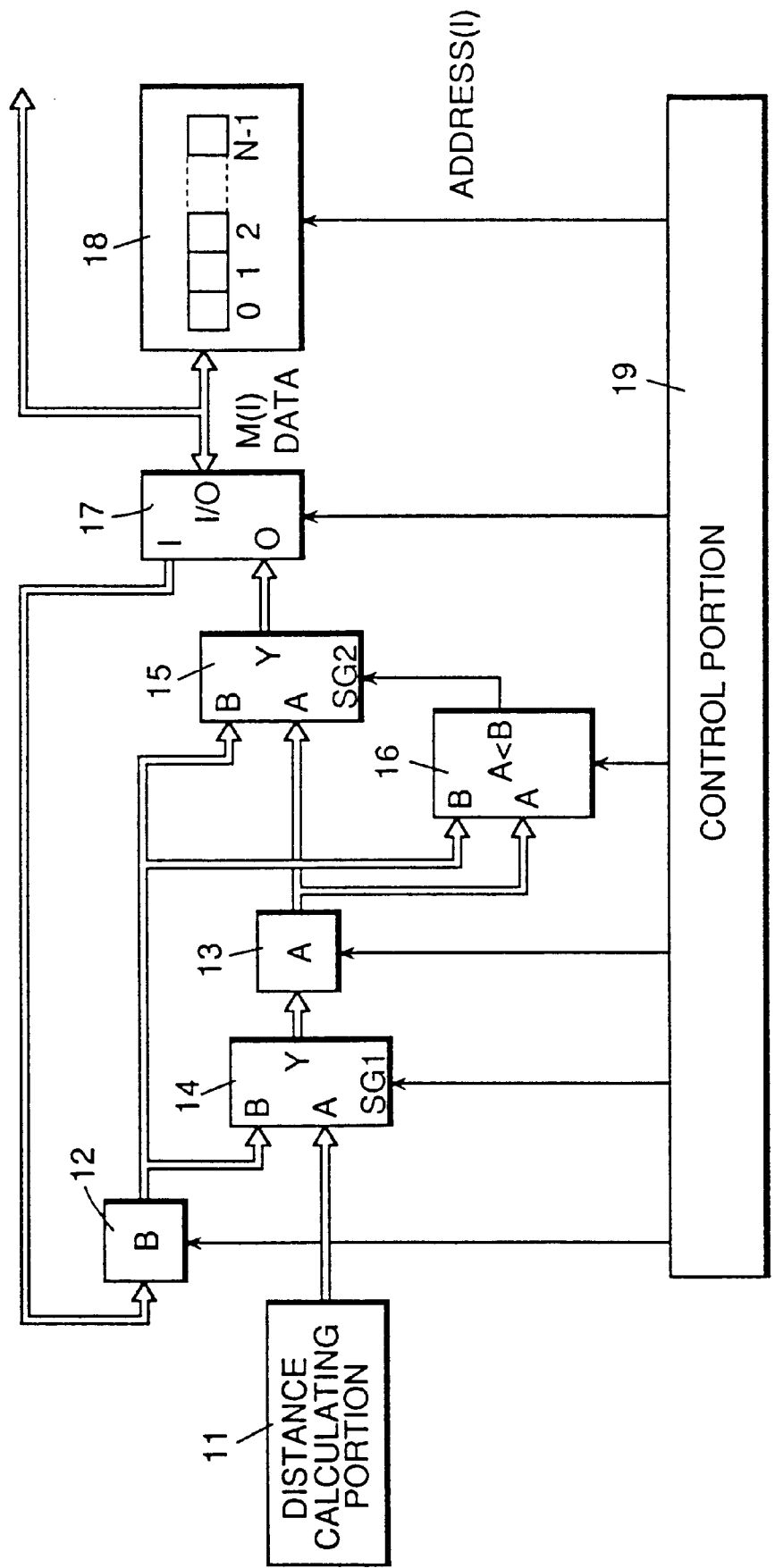
FIG. 1 is a block diagram showing an electric system of a minimum-distance storage device embodying the present invention.

An embodiment of the present invention will be described below with reference to the accompanying drawings:

FIG. 1 is a block diagram showing an electric system of a minimum-distance storage device embodying the present invention.

In FIG. 1, the minimum-distance storage device comprises a distance calculating portion 11, a first register 12, a second register 13, a first selector 14, a second selector 15, a comparator 16, a buffer 17, a result memory 18 and a control portion 19.

Figure 2:
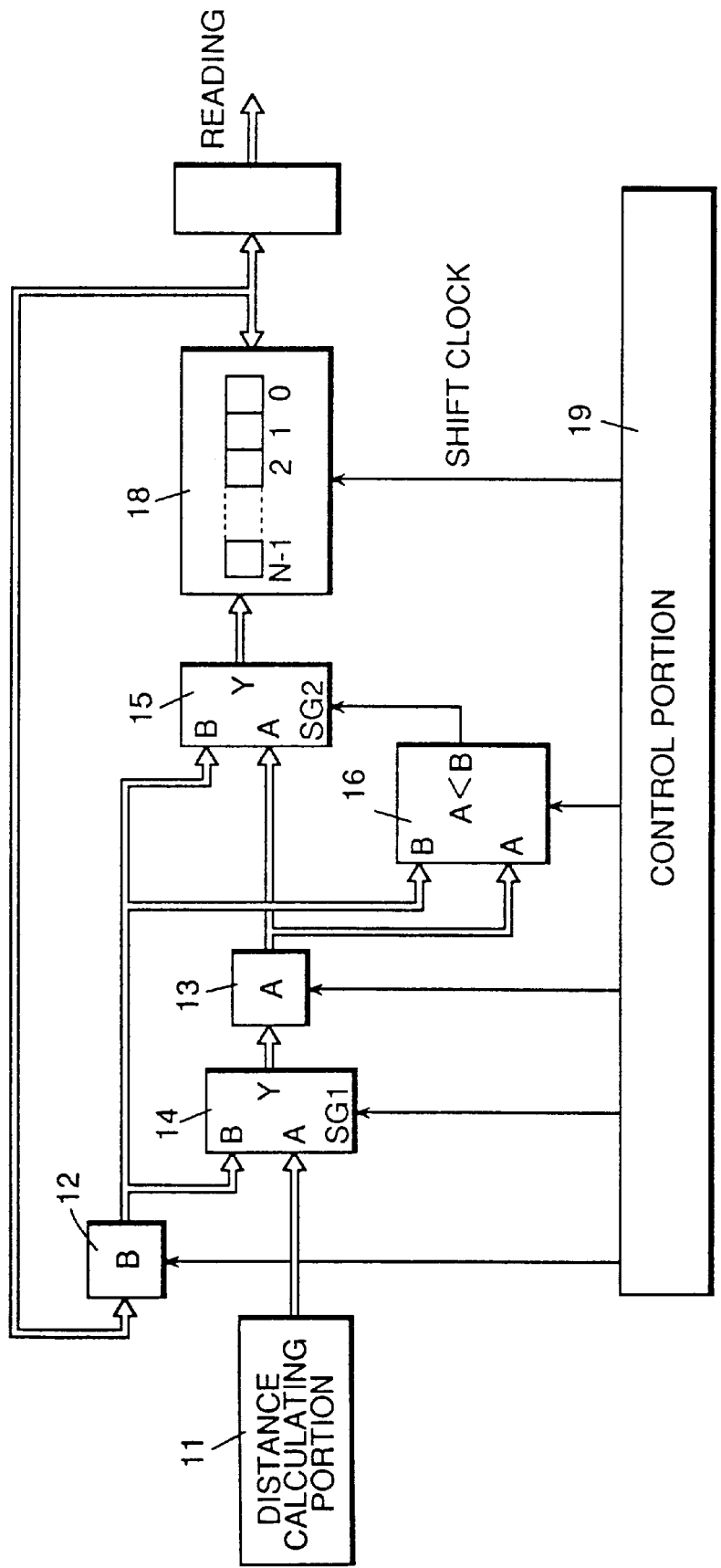
FIG. 2 is a block diagram showing another electric system minimum-distance storage device embodying the present invention.

FIG. 2 shows another minimum-distance storage device embodying the present invention, which device includes a shift register or FIFO (First-IN First-OUT) register as the result memory 18 shown in FIG. 1. Both the embodiments work on the same principle and differ from each other by using the result memory or the shift register as the result memory.

The electric system of the device shown in FIG. 2 has no need for generating addresses and therefore has much simplified circuitry as compared with the electric system of FIG. 1. The result memory unit 18 of FIGS. 1 and 2 must have memory capacity corresponding to the desired number (N) of results. An initial value is infinite and a maximum value is given to the circuit. The circuitry of FIG. 2 is advantageous to the circuitry of FIG. 1 when the number of data to be stored is small.

The result memory 18 of each embodiment is connected to an external circuit, e.g., a central processing unit (not shown) which conducts initialization of the result memory 18 and reading result data therefrom.

The first register 12 holds a content B read from the result memory 18. The second register 13 holds an input A from the distance calculating portion 11 or the content B of the first register 12.

The first selector 14 selects either the input A from the distance calculating portion 11 or the content B of the first register 12 to make it be held by the second register 13. Switching signal SG1 from the control portion 19 selects the content B to perform sorting operation or the content A to perform no sorting operation.

The second selector 15 selects either the content B of the first register 12 or the content A of the second register 13 to be written. Switching signal SG2 from the comparator 16 selects the content A of the second selector 15 when the comparison result shows A<B or selects the content B when the comparison result indicates A≧B.

The comparator 16 is a circuit for comparing the content B of the first register 12 with the content A of the second register 13.

The buffer 17 is a control circuit for inputting the content B of the result memory 18 into the first register 12 when reading data and for inputting an output Y of the second selector 15 into the result memory 18 when writing data.

The control portion 19 is a circuit that performs control operations for generating an address of the result memory 18, reading data from the memory and writing data into the memory, performing a loop control, generating signals to hold data in registers 12 and 13 and controlling the buffer 17.

The construction of the distance calculating portion 11 is out of the scope of the present invention and is similar to that for any conventional device. Therefore, it will not be further explained.

The minimum-distance storage device according to the present invention has a simply constructed hardware consisting of the second and first registers 13 and 12 for holding distance values from the distance calculating portion 11 and result data (distance) read from the result memory 18 respectively, the comparator 16 for judging which distance value is larger than the other and the first and second selectors 14 and 15 for selecting either the content of the first register 12 or the content of the second register 13 to be written. The embodiment of FIG. 2 in particular can easily replace the content of B by the content A since the result memory is composed of a shift register.

Figure 3:
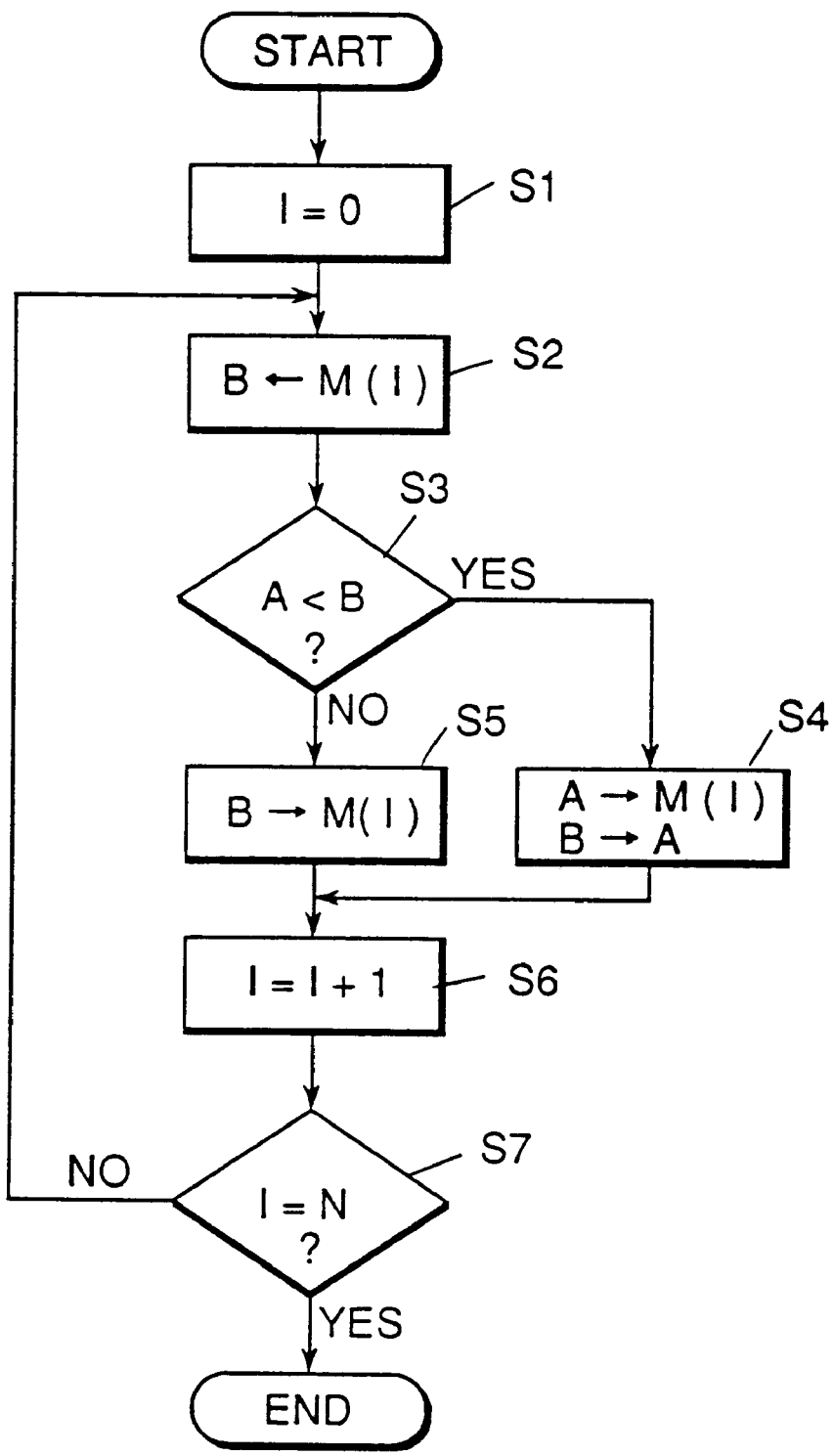
FIG. 3 is a flow chart for explaining operations of a minimum-distance storage device embodying the present invention.
Figure 4:
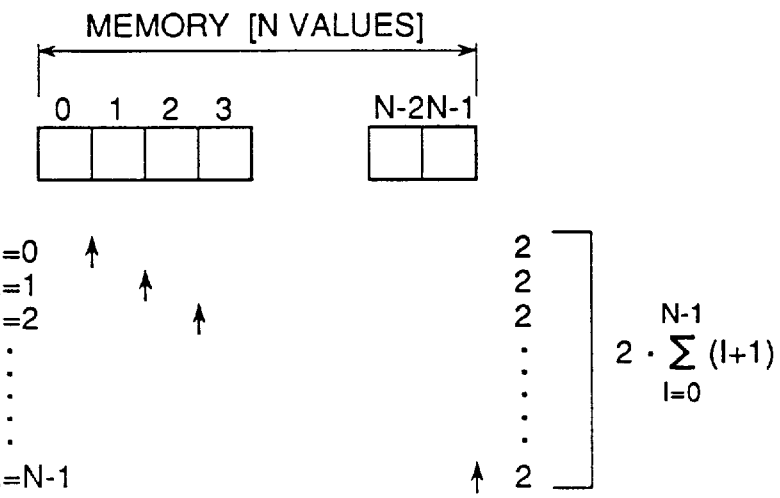
FIG. 4 is a diagram showing processing operations of a minimum-distance storage device embodying the present invention.

The operation of the above-mentioned minimum-distance storage device will be described according to a flow chart (FIG. 3) and a processing diagram (FIG. 4) as follows:

The device calculates a distance value of an input pattern from a dictionary (reference patterns), sorts and stores in due order a sequence of result distance-values. Consequently, the content of the result memory 18 must have the following relation:

M(0)≦M(1)≦M(2) . . . ≦M(I)≦M(N−1)

where I=0, 1, 2, . . . , N(N−1), and M(I) is a memory content of an address (I).

Using this relation, the device sequentially reads the memory contents in the order starting from address (0), interposes the input distance-value into an address (I) whose content is larger than the calculated distance-value and transfers the memory content of the address (I) to the address (I+1). Sorting is thus effected.

Accordingly, the operation of the embodiment of the present invention will be described on the condition that N pieces of minimum-distance values have been stored by the above-mentioned method in the ascending order in addresses (1), (2), . . . (N−1) in the result memory 18 and a distance value calculated by the distance calculating portion 11 has been stored in the second register 13.

The device reads a content B of the address (I=0) in the result memory, holds the read-out content B in the first register 12 (Steps S1 and S2) and compares the value of the content A with the value of the content B (Step S3).

If the value A is smaller than the value B (i.e., A<B), the device determines the content A as a content of address (I) and replaces the content B by the content A (Step S4). If the value A is equal to or larger than the value B (i.e., A≧B), the device returns the content B into the address (I) wherefrom it was read (Step S5).

The device updates the address (I) at the step S6 and repeats N times the processing steps from S2 (Step S7). After this, the distance data are sorted according to their values and stored in the ascending order in the sequence from the address (0) to the address (N−1) in the result memory.

In this embodiment, the number of memory accesses does not depend on branching conditions and reading and writing operations are effected each one time for one objective address (I) (i.e., T=2×N). Owing to the thus reduced number of memory accesses, the device according to the present invention may have a correspondingly increased processing speed as compared with the conventional device.

As is apparent from FIGS. 1 and 2, a hardware realizing the shown circuit system may be small and simple in construction because there is no need for generation of an adjoining address and multiloop control.

Figure 5:
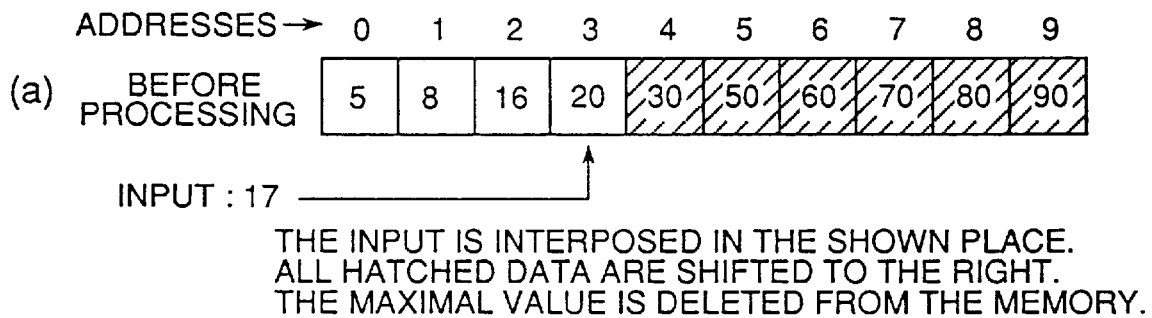
FIG. 5($a$) and ($a$) are views showing the concept of operations of a minimum-distance storage device embodying the present invention.
Figure 5:
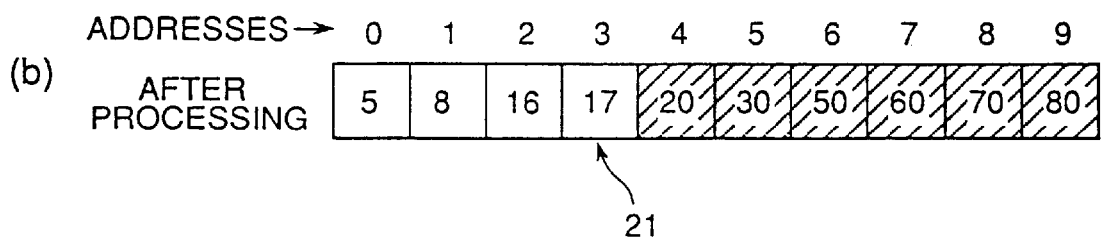

Referring to FIGS. 5 and 6 illustrating an operation concept and a list of operation steps respectively, the operation of the embodiment in case of storing 10 distance values in the result memory 18 will be described below:

In FIG. 5, there is shown (a) a content of the memory 18 before processing and (b) a content of the memory 18 after processing.

It is assumed that a current distance value (input 17) calculated by the distance calculating portion 11 is held in the second register 13 before processing.

Under this condition, the aforementioned processing steps are performed with the result that the input distance-value (17) is written in an address (3) of the result memory 18 (shown by numeral 21 in FIGS. 5 and 6), a distance value (20) stored in the address (3) is written into an address (4) shifted to the right by one, a distance value (30) stored in the address (4) is written into an address (5) shifted to the right by one and so on to be in sequence to finally delete a distance value (90) that was stored in a final address (9) before processing.

Namely, a memory content is left as it is if its value is smaller than an input value (input distance-value). When the memory content value becomes larger than the input value, the latter is written into the memory and the memory contents (distance values) after the written input value are shifted to the right each by one address and the maximal value is deleted.

The number of practical memory accesses necessary for storing minimum distance values therein is below determined, expressing the number of reference patterns by P and the number of storable minimum-distance values by N.

The number of accesses T1 according to the present invention is T1=P+2×P'×N, whereas the number of accesses T2 according to a conventional method for storing minimum distance values by using a known sort algorithm is T2=P×(N+1)+N×( N−1).

A first term of the above expression is the number of memory accesses necessary for judging whether an input distance value is included within the Nth order of reference patterns, and a second term of the above expression is the number of memory accesses necessary for arranging (sorting) N pieces of minimum distance values. According to the present invention, the above-mentioned judgment is made only one time for each reference pattern because the maximal value is always stored in a predetermined memory address, whereas in case of using the known sort algorithm, it is necessary to detect a maximal value among N pieces of minimum distances randomly stored and, therefore, to replace it by the input value.

The number P' of patterns to be practically referenced as a minimum distance is determined as follows:

$$2 \times P' \times N'P \times (N+1)+N \times (N-1)-P$$

wherefrom $$P' \leq (P+N-1)/2.$$

Namely, the present invention may have less number of memory accesses as compared with the conventional method if no more than a half of reference patterns relates to minimum distances to be practically objects.

The above-mentioned embodiment has an advantage that the result memory 18 can be constructed of a shift register. Use of the shift register makes it possible to equivalently shorten the processing time because the shift register may be accessed at a half the usual access speed.

Figure 7:
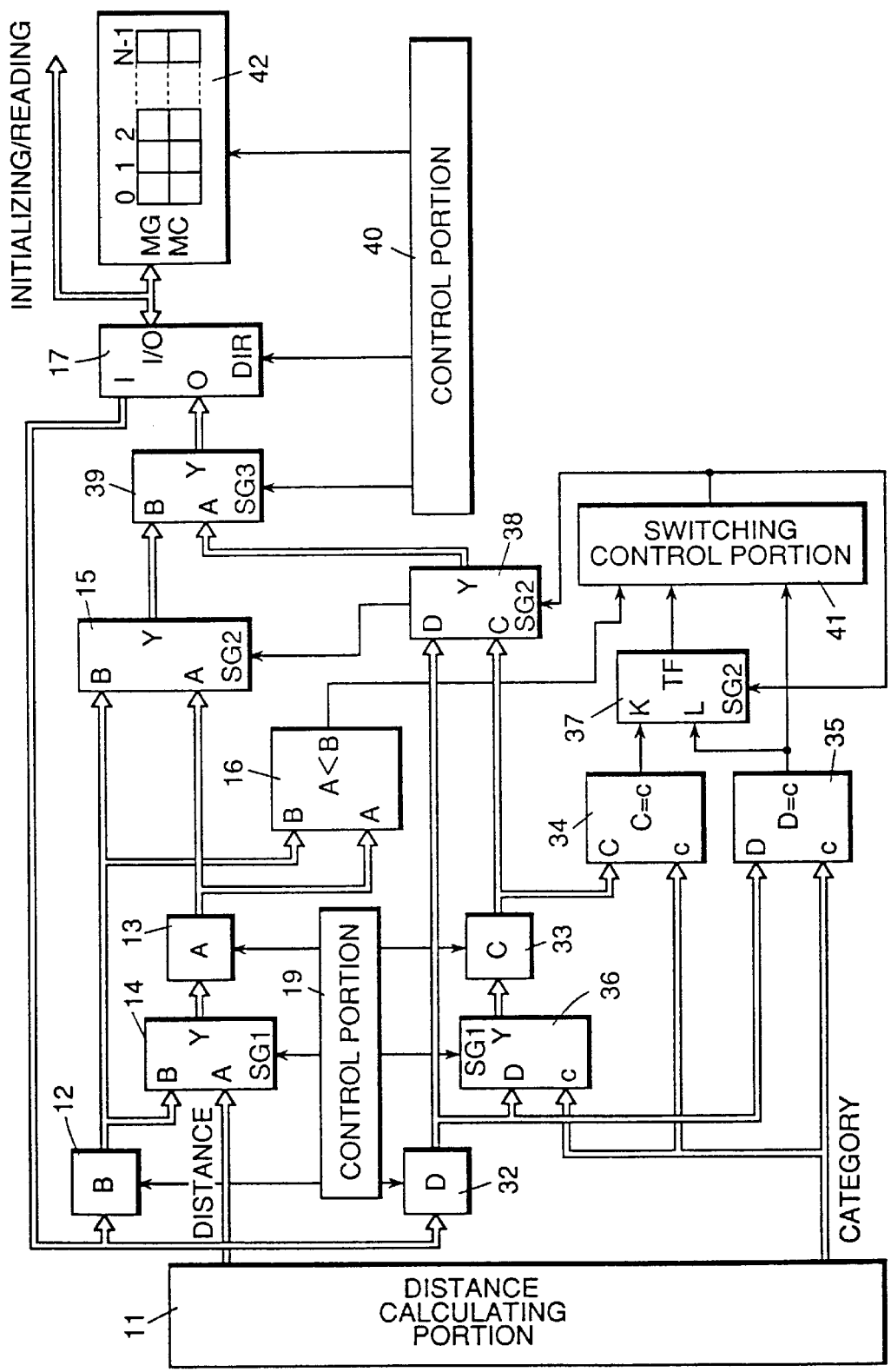
FIG. 7 is a block diagram showing another electric system of a minimum-distance storage device embodying the present invention.

The processing operation of the minimum-distance storage device according to the present invention in case of arranging minimum distances in consideration of the same category will be explained as follows:

FIG. 7 is a block diagram showing another electrical system of a minimum-distance storage device embodying the present invention.

The minimum-distance storage device includes a distance calculating portion 11, a first register 12, a second register 13, a first selector 15, a comparator 16, a buffer 17 and a control portion 19. These components are similar to those shown in FIGS. 1 and 2 and, therefore, will not be further explained.

Besides the above-mentioned components, this embodiment is also provided with a third register 32, a fourth register 33, a second comparator 34, a third comparator 35, a third selector 36, a fourth selector 37, a fifth selector 38, a sixth selector 39, a control portion 40, a switching control portion 41 and a result memory 42.

The third register 32 holds category code D read from the result memory 42 and the fourth register 33 holds an input category code c from the distance calculating portion 11 or the content D of the third register 32.

The third selector 36 is a selector circuit for writing either the category code D of the third register 32 or the input category code c and a switching signal SG1 selects the category D when performing the processing or the category c when skipping.

The second comparator 34 discriminates whether the input category c coincides with the category C of the fourth register 33. The third comparator 35 discriminates whether the input category c coincides with the category D of the third register 32.

The fourth selector 37 selects one of discriminating results made by the comparators 34 and 35. A switching signal SG2 is determined by the switching control portion 41 depending upon a combination of an output (A<B) of the first comparator 16, an output TF of the fourth selector and an output (D=c) of the third comparator 35.

The fifth selector 38 is a selector circuit for writing either the content D of the third register 32 or the content C of the fourth register 33. The switching signal SG2 is changed over by the control portion 41 above mentioned.

The sixth selector 39 is a selector circuit for determining whether to write the "category" output of the fifth selector 38 or the "distance" output of the second selector 15.

The result memory 42 has a separate area MG for storing distance data and a separate area MC for storing category data. It may also be constructed in such a way as to store in a continuous memory space both data in the form of "distance" and "category" according to the time shared processing.

Figure 8:
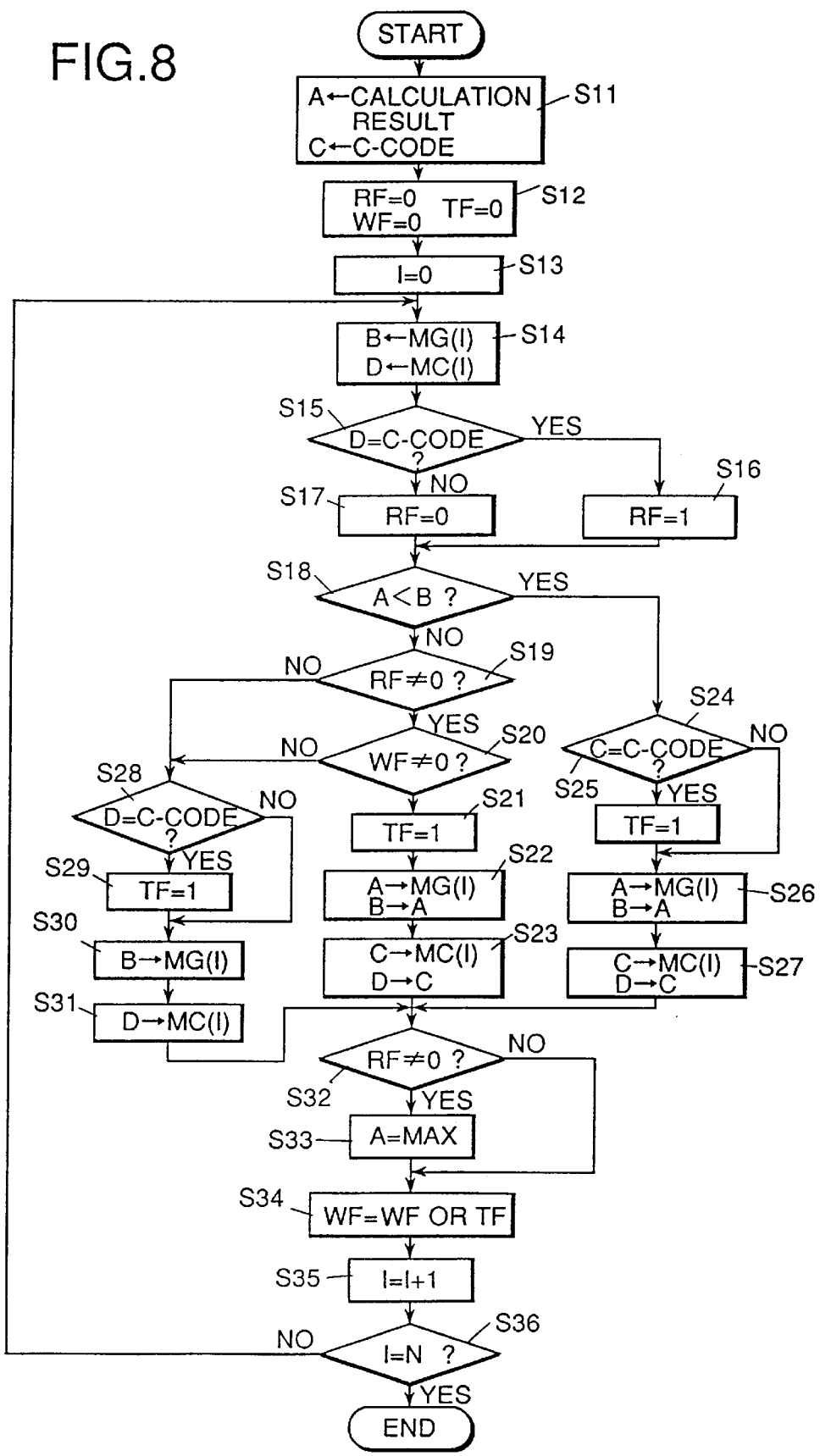
FIG. 8 is a flow chart for explaining another embodiment of a minimum-distance storage device of the present invention.

Referring to the flow chart of FIG. 8, the operation of the thus constructed minimum distance storing device will be described below:

The operation for arranging the minimum distance data in ascending order will not be described because it is the same as explained before with reference to FIGS. 3 to 6. Only the same-category processing operation will be described.

Like the above embodiment, this embodiment is assumed to start the processing operation under the condition that N pieces of minimum distances together with related category data are stored in ascending order in addresses (1), (2), . . . , (N−1) in the result memory 42, a distance A calculated by the distance calculating portion 11 is stored in the second register 13 and a category C (shown as "C←C-CODE " in FIG. 8) of the calculated distance A is stored in the fourth register 33 (Step S11). In FIG. 8, characters RF, TF and WF designate category-corresponding flags which were cleared (Step S12) before processing and are set (=1) based on the following respective conditions:

Namely, the flag RF is set (RF=1) when a category code read from the result memory 42 (hereinafter referred to as read-out category) and the category code input from the distance calculating portion 11 (hereinafter referred to as input category) are identical with each other; the flag WF is set (WF=1) when a category code is found to be identical with the input category code during the sorting operation; and the flag TF is set (TF=1) when a category code to be written into the result memory 42 is identical with the input category code.

Under the above-mentioned conditions, the device reads the content of an address (I=0) of the result memory 42 and temporarily stores a read-out distance B in the first register 12 and a read-out category D in the third register 32 (Steps c13, S14). When the read-out category D is identical with the input category c, the device sets the flag RF (RF=1) (Step S16). If not so, the device cancels the flag RF (RF=0) (Step S17) and advances the processing to Step 18.

At Step S18, the device compares the content value B of the register 12 with the content value A of the register 13, sets the flag TF (TF=1) (Step S25) if the value A smaller than B (A<B) and the category C for the value A is identical with the input category c (Steps S18, S24), determines the calculated distance A as the content of the area MG of the address (I) and then replaces the read-out distance B by the calculated distance A (Step S26). The device also determines the input category C as a content of the area MC of the address (I), replaces the read-out category D by the input category C (Step S27) and proceeds to Step 32.

When A≧B and any one of flags is unset (=0) (Steps S18, S19, S20), the processing proceeds to Step S28. At Step S28, the device sets the flag TF (TF=1) (Step S29) if the category D for the read-out distance B is identical with the input category c, determines the read-out distance B as the content of the area MG of the address (I) (Step S30) and the category D as the content of the area MC of the address (I) (Step S31) and then advances the processing to Step S32.

When A≧B and both flags are set (=1) (Steps S18, S19, S20), the processing proceeds to Step S21 and the flag is set (TF=1). At this step, the read-out distance B can not be re-written in the address (I) because the identical category already exists therein.

Therefore, the device determines the calculated distance A as the content of the area MG of the address (I) and then replaces the calculated distance A by the read-out distance B (Step S22). The device also specifies the input category C as the content of the area MC of the address (I), replaces the input category C by the read-out category D (Step S23) and then proceeds to Step S32.

When the flag RF is set (RF=1) at Step S32, the device specifies the calculated distance A as the maximal value (Step S33) to delete the precedent category. The flag WF is set (WF=1) when the identical category is written (Step S34).

The device updates the address (I) at Step S35 and repeats the same operation cycle from Step S14 by N times (Step S36) with the result that the distances are arranged in ascending order with corresponding category codes in the addresses (0) to (N−1) of the result memory 42.

An embodiment of the present invention, which has a result memory 42 for storing 10 distances and 10 category codes, will be described below with reference to FIG. 9 illustrating the operation concept and FIGS. 10 and 11 showing lists of operation steps.

In FIG. 9, there is shown (a) a content of a result memory 42 before sorting with an input (distance: 00, category: 00) and (b) a content of the result memory 42 after sorting; (c) a content of the result memory 42 before sorting with an input (distance: 26, category: 90) and (d) a content of the result memory 42 after sorting; (e) a content of the result memory 42 before sorting with an input (distance: 18, category: 90) and (f) a content of the result memory 42 after sorting.

Namely, (a) and (b) shown in FIG. 9 relate to a first example of the initial-state operation of the device, (c) and (d) shown in FIG. 9 relate to a second example of the operation of the device and (e) and (f) shown in FIG. 9 relate to a third example of the operation of the device. FIG. 10 is a list of operations corresponding to (c) and (d) shown in FIG. 9 and FIG. 11 is a list of operations corresponding to (e) and (f) shown in FIG. 9.

In the first example, an input distance data (00) and an input category code (00) are written in each address (I).

In the second example, a category code (90) identical with an input category code (90) is also written in an address (8) of the result memory 42 and distance data (80) corresponding to said category code is larger than the input distance (26).

In this case, the device deletes, from the address (8), the category code (90) which identical with the input category code (90) and the distance value (80) which is larger than the input distance value (26).

Consequently, the result memory 42 may store the distances including the input distance in the ascending order having deleted the same category content of the address (8).

In the third example, a category code (90) identical with an input category code (90) is also written in an address (1) of the result memory 42 and distance data (10) corresponding to said category code is smaller than the input distance (18).

In this case, the device writes the category code (90) which is identical with the input category code (90) and the distance value (10) which is smaller than the input distance value (18) in the same address (1) without sorting the records in the result memory 42.

Although the device according to the present invention works to arrange the distances in the ascending order in the above-mentioned examples, it may also sort records with a key of similarity and represent them in the descending order (from the higher similarity). This is realized by exchanging the size criterion by the similarity criterion A=0 in the flow charts of FIGS. 3 and 8. An initial value shall be 0.

A minimum distance storage device according to the present invention is constructed in such a way that a read-out distance read by a first reading portion from a first storing portion and being temporarily held in a first register portion and an input distance input from a distance calculating portion and being temporarily held in a second register portion are compared with each other by a first writing portion which then writes the read-out distance which is smaller than the input distance in the place where it was stored or writes the input distance which is smaller than the read-out distance into the place where the read-out distance was stored and writes thereafter the read-out distances including the compared read-out distance into places sequentially moved to the right each by one in the first storing portion. The minimum distance storage device thus constructed is easy to control and simple in circuitry because it does not need the multiloop control and can easily generate addresses.

A minimum distance storage device according to the present invention is constructed in such a way that, in parallel to and with priority to processing by the second writing portion, a category code held in a third register portion is compared with a category code held in a fourth register portion, and, if both category codes coincide with each other and the read-out distance is smaller than the input distance, the coincident category code and the read-out distance are written into the places where they were stored in the second storing portion, or, if the both category codes coincide with each other and the read-out distance is larger than the input distance, the coincident category code and the input distance are deleted from the second storing portion. This realizes the minimum distance storage which is easy to control and simple in circuitry and which does not need the multiloop control, can easily generate addresses and, at the same time, can detect a minimum distance of the same category.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A minimum distance storage device comprising:

a first storing portion for storing a plurality of distances between an input pattern and a reference pattern in ascending order in sequence;

a first reading portion for reading the distances from the first storing portion in the ascending order in sequence;

a first register portion for temporarily holding a distance read by the first reading portion;

a second register portion for temporarily holding an input distance; and a first writing processor portion for comparing the read-out distance held in the first register portion with the input distance held in the second register portion, writing the read-out distance into a location in the first storing portion in which the read-out distance was stored if the read-out distance is smaller than the input distance, and writing the input distance in the location in the first storing portion in which the read-out distance was stored and writing the read-out distance and distances stored in ascending locations subsequent the location in the first storing portion in corresponding locations shifted by one location in the ascending order if the read-out distance is larger than the input distance.

2. A minimum distance storage device comprising:

a first storing portion for storing a plurality of distances between an input pattern and a reference pattern in ascending order in sequence and storing a plurality of category codes respectively corresponding to the distances;

a first reading portion for reading the distances and the category codes for the distances from the first storing portion in the ascending order in sequence;

a first register portion for temporarily holding a distance and a category code read by the first reading portion;

a second register portion for temporarily holding an input distance and a related category code corresponding to the input distance;

a first writing processor portion for comparing the read-out distance held in the first register portion with the input distance held in the second register portion, writing the read-out distance and the read-out category code into a location in the first storing portion in which the read-out distance and the read-out category code were stored if the read-out distance is smaller than the input distance, and writing the input distance and the related category code into the location in the first storage portion in which the read-out distance and the read-out category code were stored and writing the read-out distance and distances stored in ascending locations subsequent the location in the first storing portion into corresponding locations shifted by one location in the ascending order if the read-out distance is larger than the input distance; and a second writing processor portion for comparing, in parallel with processing by the first writing processor portion, the read-out category code held in the first register portion with the related category code held in the second register portion, writing the read-out distance and the read-out category code into the location in the first storage portion in which the read-out distance and the read-out category code were stored in the first storing portion if the read-out distance is smaller than the input distance and the read-out category code and the related category code are the same, and deleting the read-out category code and the read-out distance from the first storing portion prior to the processing by the first writing processor portion if the read-out distance is larger than the input distance and the read-out category code and the related category code are the same.

3. A storage apparatus comprising:

storage means for storing a plurality of values in sequence in ascending order;

reading means for reading the values from said storage means sequentially in the ascending order;

register means for temporarily holding a value read by said reading means and an input value; and control means for comparing the read value and the input value held in said register means, for writing the read value into a location in said storage means in which the read value was stored if the read value is smaller than the input value and for writing the input value in the location in said storage means in which the read value was stored and writing the read value and values stored in ascending locations subsequent the location in corresponding locations shifted by one location in the ascending order if the read value is greater than the input value.

4. The storage apparatus of claim 3, wherein the values are distances between respective input patterns and a reference pattern.

* * * * *